(12) United States Patent
Van Der Velden

(10) Patent No.: US 8,645,731 B2
(45) Date of Patent: Feb. 4, 2014

(54) CHARGE SUSPEND FEATURE FOR A MOBILE DEVICE

(75) Inventor: Frank Van Der Velden, Berghem (NL)

(73) Assignee: ST-Ericsson SA, Plan-les-Ouates (CH)

( * ) Notice: Subject to any disclaimer, the term of this patent is extended or adjusted under 35 U.S.C. 154(b) by 412 days.

(21) Appl. No.: 12/991,094

(22) PCT Filed: May 4, 2009

(86) PCT No.: PCT/EP2009/055351
§ 371 (c)(1),
(2), (4) Date: Mar. 23, 2011

(87) PCT Pub. No.: WO2009/135816
PCT Pub. Date: Nov. 12, 2009

(65) Prior Publication Data
US 2011/0167284 A1   Jul. 7, 2011

(30) Foreign Application Priority Data

May 5, 2008   (EP) .................... 08103826

(51) Int. Cl.
*G06F 1/32* (2006.01)
*G06F 1/00* (2006.01)
*H02J 7/00* (2006.01)

(52) U.S. Cl.
USPC .................. 713/320; 713/310; 320/137

(58) Field of Classification Search
USPC .......................................... 713/320
See application file for complete search history.

(56) References Cited

U.S. PATENT DOCUMENTS

| | | | |
|---|---|---|---|
| 6,178,514 B1 | 1/2001 | Wood | |
| 7,508,161 B2 * | 3/2009 | Harada | 320/103 |
| 7,631,203 B2 * | 12/2009 | Irie | 713/310 |
| 7,805,624 B2 * | 9/2010 | Inai | 713/310 |
| 8,103,886 B2 * | 1/2012 | Irie | 713/310 |
| 2002/0162036 A1 | 10/2002 | Kim et al. | |
| 2003/0030412 A1 | 2/2003 | Matsuda et al. | |
| 2004/0251878 A1 * | 12/2004 | Veselic | 320/141 |
| 2007/0046268 A1 | 3/2007 | Irie | |

FOREIGN PATENT DOCUMENTS

| | | |
|---|---|---|
| EP | 1710662 A | 10/2006 |
| EP | 1821384 A | 8/2007 |
| WO | 2006116298 A | 11/2006 |

OTHER PUBLICATIONS

Compaq et al: "Universal Serial Bus Specification Revision 2.0" pp. 119-193, Apr. 27, 2000.
PCT: Written Opinion of the International Searching Authority of PCT/EP09/55351, International Publication No. WO2009/135816.

* cited by examiner

*Primary Examiner* — Suresh Suryawanshi
(74) *Attorney, Agent, or Firm* — Howison & Arnott, LLP

(57) ABSTRACT

An electronic device is described comprising connecting means configured to establish a connection to another device, and configured to receive electrical power from the connection and configured to receive information from the other device via the connection and comprising determining means configured to determine a set of limitations, wherein for at least one electronic unit configured to receive electrical power, the set of limitations comprises a limitation of electrical power to be distributed to the at least electronic unit and wherein the determining means is further configured to determine the set of limitations based on the information received from the other device, wherein the received information comprises a request for a reduced power consumption of the electronic device.

20 Claims, 6 Drawing Sheets

CHARGE SUSPEND FEATURE FOR A MOBILE DEVICE

CROSS-REFERENCE TO RELATED APPLICATIONS

This application is a U.S. National Phase application submitted under 35 U.S.C. §371 of Patent Cooperation Treaty Application Serial No. PCT/EP2009/055351, filed May 4, 2009, entitled CHARGE SUSPEND FEATURE FOR MOBILE PHONE, which application claims priority to European Patent Application Serial No. EP 08103826.7, filed May 5, 2008 and entitled CHARGE SUSPEND FEATURE FOR A MOBILE PHONE, the specifications of which are incorporated herein by reference in their entireties.

TECHNICAL FIELD

The invention relates to the field of charge control for electronic devices, particularly mobile devices chargeable by a serial connection.

BACKGROUND

Contemporary mobile devices are often able to run on power supplied by chargeable electrical storage components like for example a chargeable battery. Usually the chargeable battery is internal to the mobile device and not visible from the outside. Some of these mobile devices, like for example laptop computers, may be configured for a dedicated connection to a power socket like the wall AC power sockets found at home and in offices, usually by means of a charger transforming the AC voltage to a lower DC voltage suitable for the mobile device. When such a connection to an external power supply is established, the chargeable battery is charged. On the other hand, these mobile devices are also often able to connect to other devices, often to several at the same time, via various wired connections which are often serial connections. Examples include the universal serial bus (USB), which comes in different varieties and versions like Hi-Speed USB, On-The-Go USB (OTG USB), Hi-Speed On-The-Go USB (Hi-Speed OTG USB) and even Wireless USB, as well as IEEE 1394 also known under the FireWire brand name. These serial interfaces allow not only exchange of communication data between the connected devices, but also the supply of electrical power. The electrically supplied power is used on the one hand for powering the serial connection itself, but may also be further received by any device connected which is not supplying the electrical power for the serial connection. Thus, a device connected in such a way to other devices supplying electrical power may use this electrical power from the connection for its operation as well as for the charging of its chargeable batteries. This is also known as "charge and play" functionality. A dedicated charging device may also connect to a mobile device to be charged via an adapter using such a serial connection. In fact, some mobile devices only provide such a serial connection interface for charging and have no separate dedicated interface.

Often, however, if a mobile device detects that it is connected via one of its serial data interfaces and the device it is connected to is supplying power, then it will use this electrical power for its operation as well as for charging its chargeable batteries. Usually at least one of the devices connected is required to supply the electrical power for the serial connection. Thus when only mobile devices running on their respective chargeable batteries are connected, then the one that is not supplying the power to the serial connection will start charging its chargeable batteries, not knowing that the device supplying the power is not connected to a wall socket power supply. Consequently, it is a problem that in such a situation the mobile device will just charge itself off the other's battery, potentially even causing the battery of the device supplying the power to be drained completely.

Published United States Patent Application 2007/0046268 A1 discloses a terminal connectable to an external device with a battery that receives power from the external device via a connection, a determination unit that determines whether the external device is a dedicated power supply apparatus on the basis of a detection result and a controller that controls charging of the battery on the basis of a determination result.

It is therefore an object of the present invention to be able to communicate to a mobile device receiving power from a connection that the power supplied to the device via the connection should be used sparingly.

SUMMARY

According to the invention there is provided an electronic device comprising connecting means configured to establish a connection to at least one other device and configured to receive electrical power from the connection and configured to receive information from the at least one other device via the connection. The electronic device further comprises determining means configured to determine a set of limitations, wherein for at least one electronic unit configured to receive electrical power the set of limitations may comprise a limitation of electrical power to be distributed to the at least one electronic unit and wherein the determining means are further configured to determine the set of limitations based on the information received from the at least one other device. According to the invention, the received information comprises a request for a reduced power consumption of the electronic device.

Further, a method for determining a set of limitations is disclosed, wherein for each one of the components configured to receive electrical power the set of limitations may comprise a limitation of electrical power to be distributed to the respective component configured to receive electrical power. The determining is based on information received by an electronic device from at least one other device to which the electronic device is connected, which received information comprises a request for a reduced power consumption of the electronic device.

Moreover a module for an electronic device is provided. The module comprises input means configured to receive electrical power. The module further comprises first supply means configured to supply a first portion of the received electrical power to a chargeable electrical storage component. The module also comprises second supply means configured to supply a second portion of the received electrical power. And the module comprises switching means configured to switch off or reduce the first portion of the received electrical power supplied to the chargeable electrical storage component by the first supply means. According to the invention, the switching means is configured to switch off the first portion of the received electrical power upon receipt of an information comprising a request for a reduced power consumption of the electronic device.

The electronic device may be a mobile electronic device, like a laptop computer, a personal digital assistant (PDA), a mobile phone, a printer, a portable juke box, a portable multimedia device, a digital still camera, a video camera, a mobile music player or a flashlight. The connecting means may for example be a connector for a wired connection and the associated circuitry. The connecting means can also include a wire or a cable itself The connecting means can also just be a receptor for a connector or a wire or a cable. The connection may be a connection according to a serial bus standard. The connection may also be a connection according to a parallel bus standard.

The device to which the electronic device according to the invention is connected can be another mobile electronic device from the examples given above. It may also be a charging device, an external electrical storage device like a battery, an adapter for a power socket, or a rectifier. The device to which the electronic device is connected may also be a personal computer, a television, a navigation device, a multimedia device, the electronic circuitry of a car, an electronic part of a car, a part of the installation of a boat, a ship, a train or an airplane. The electrical power can be compromised in the electrical power supplied to power the connection or it can be an electrical power dedicated to be supplied to the electronic device. The electrical power may be supplied as alternating current or as direct current.

The information received from the at least one other device via the connection may be information coded in analog or digital electronic data. It may also be coded in optical data. The information may be received according to a protocol comprising several protocol layers. The request for reduced power consumption may be a message according to a communication protocol. The request may indicate a command to reduce the power consumption. The request may be an indication that the at least one other device is supplying the electrical power from a battery source or that the other device is supplying the electrical power from a power generator or from a wall socket power supply. The request may also comprise an indication whether or not the at least one other device is connected to a wall socket power supply.

The communication over the connection, including the transfer of the information from the at least one other device, may occur simultaneously to and independent of the supply of electrical power from the connection to the electronic device.

The determining means may be a software component running on a processor of the electronic device. The determining means may also be a hardware component or an integrated circuit. The electronic unit configured to receive electrical power may be any electronic unit using electrical power in its operation. The electronic component may be a chargeable electrical storage component like a battery, a processing component like a microcontroller, an integrated circuit, a relay, a sensor, an analog to digital converter, a memory component, a disk drive, a card reader, a display, a communication adapter like a module for wireless communication, an audio amplifier, a loudspeaker, a receiver for a global navigation satellite system, an inertial sensor, or a radio-frequency identification (RIFD) reader.

Electrical power is supplied to these electronic units by distributing the electrical power to the electronic unit. A limitation of electrical power to be distributed to an electronic unit may comprise supplying no electrical power to the electronic unit. A limitation may also comprise supplying electrical power up to a particular power limit or supplying electrical power up to a particular limit on the total energy supplied to that electronic unit in a particular time. A limitation may also comprise limiting the electrical power supplied to a maximum power given in terms of a percentage of the total electrical power supplied to one or more electronic units. A limitation may further comprise not limiting the electrical power supplied to an electronic unit. A set of limitations comprises a limitation for each of one or more electronic units. A set of limitations may also comprise supplying no electrical power to one or more electronic units and may also comprise not limiting the electrical power supplied to one or more electronic units.

The request for a reduced power consumption of the electronic device comprised in the received information may comprise a request to reduce the power supplied to specific electronic units. The request for a reduced power consumption of the electronic device comprised in the received information may comprise a request to inhibit charging of a chargeable component.

The module for an electronic device may comprise an integrated circuit, a processor executing a software component or a hardware component on a printed circuit board. The input means may comprise a pin or a connector adapted to receive electrical power. The supply means may comprise a pin or a connector adapted to supply electrical power. The supply means may also comprise components adapted to regulate or convert the supplied electrical power, for example in order to limit the electrical current supplied or to control the voltage of the electrical power supplied. The supply means may also comprise circuitry to distribute the electrical power between the supply means such that the total electrical power distributed to all supply means is approximately constant. The switching means may comprise a mechanical switch, a relay or electronic switching means. The electronic switching means may comprise transistors, for example circuitry based on complementary metal-oxide-semiconductors (CMOS) or on bipolar transistors.

The received information may comprise information about the available power of the at least one other device. The information about the available power of the at least one other device may be a quantitative information, a qualitative information or an information about the source of the electrical power of the at least one other device.

The connection may be a USB connection. The connection may also be a wireless USB connection, a Hi-Speed USB connection, an OTG USB, a Hi-Speed OTG USB connection or a connection based on a further development of the USB interface standard.

The connection may be an IEEE 1394 connection or a connection based on a further development of the IEEE 1394 serial bus interface standard.

The connecting means may be configured to determine whether the at least one other device supplies electrical power to the connection. Whether or not the at least one other device supplies electrical power to the connection may depend on the orientation of a cable used for the connection. The connecting means may be configured to request that the at least one other device supply electrical power to the connection. The connecting means may be configured to determine whether the at least one other device supplies electrical power to the connection by evaluating the signal level of one or more pins, by evaluating the resistance of one or more pins, by receiving a message from the at least one other device, or by evaluating the result of a protocol determining which device supplies electrical power to the connection. The connecting means may be configured to determine whether the at least one other device supplies electrical power to the connection by evaluating the signal level of the ID pin of a Micro-USB connector.

The connecting means may be configured to determine control of the connection by communicating with the at least one other device using a host negotiation protocol (HNP). A device that has control of the connection may be the host. In particular, the connecting means may be configured to determine which device is the host of the connection by communicating with the at least one other device using a HNP. A device that has control over the connection may be able to control the sending and receiving of information over the connection. A device that has control over the connection may be able to control the timing of information transmitted over the connection.

The electronic device may further comprise distributing means configured to distribute the received electrical power to the at least one electronic unit according to the determined set of limitations. The distribution means may comprise logic circuitry, in particular logic circuitry in an integrated circuit. The distribution means may comprise power transmission circuitry controlled by logic circuitry. The distribution means may be configured to switch and conduct electrical voltage and current. The distribution means may be configured to distribute the received electrical power to at least one electronic unit which is internal to the electronic device. The distribution means may be configured to distribute the received electrical power to at least one electronic unit which is external to the electronic device. Electrical power distributed by the distribution means may be in accordance with a determined set of limitations if the power distributed to each electronic unit does not exceed the limit given for that electronic unit by the set of limitations.

The electronic device may comprise at least one electronic unit configured to receive electrical power. The electronic unit configured to receive electrical power may be internal to the electronic device.

The electronic device may comprise a chargeable electrical storage component. The chargeable electrical storage component may be a chargeable battery. The chargeable battery may be a Lithium-ion battery.

The received information may comprise a request to suspend charging of the chargeable electrical storage component. The request to suspend charging of the chargeable electrical storage component may be a message from the at least one other device. The received information may comprise an information about an electrical current budget of the at least one other device.

The electronic device may be an electronic device conforming to the power device class of USB. The received information may comprise an inhibit charge usage of the power device class of USB.

The determining means may be configured to determine a set of limitations, which set of limitations comprises a limitation of electrical power to be distributed to the chargeable electrical storage component, which limitation is a limitation to a reduced level of electrical power. The limitation to a reduced level of electrical power may be a limitation to a level of electrical power, which is less than the level of electrical power the chargeable electrical storage component is configured to receive.

The determining means may be configured to determine a set of limitations, which set of limitations comprises a limitation of electrical power to be distributed to the chargeable electrical storage component, which limitation is a limitation to a zero level of electrical power. The set of limitations may comprise a limitation that no electrical power is distributed to the chargeable electrical storage component.

It may be that the at least one electronic unit configured to receive electrical power is externally connected to the electronic device. The at least one electronic unit configured to receive electrical power may be connected via a plug and a connector to the electronic device. The at least one electronic unit configured to receive electrical power may be connected via a cable or a wire to the electronic device.

The second portion of the received electrical power, which the second supply means comprised in the module for an electronic device according to the invention are configured to supply, may be complementary to the first portion of the received electrical power.

The module for an electronic device may be an integrated circuit.

The module for an electronic device may be a processing component.

The module for an electronic device may comprise a register controlling the switching means, which register is configured to be written to by a serial line protocol. The register may be configured to be written by the inter-integrated circuit (I2C) serial bus protocol. The register may further be configured to be written by the serial peripheral interface bus (SPI) protocol. The register may also be configured to be written by means of a universal asynchronous receiver/transmitter (UART). The register may moreover be configured to be written by the C-bus protocol. The register may be configured to be written by another serial or parallel data interface protocol.

It is to be understood that all presented exemplary features of the invention may also be used in any suitable combination.

DETAILED DESCRIPTION

Figure 1:
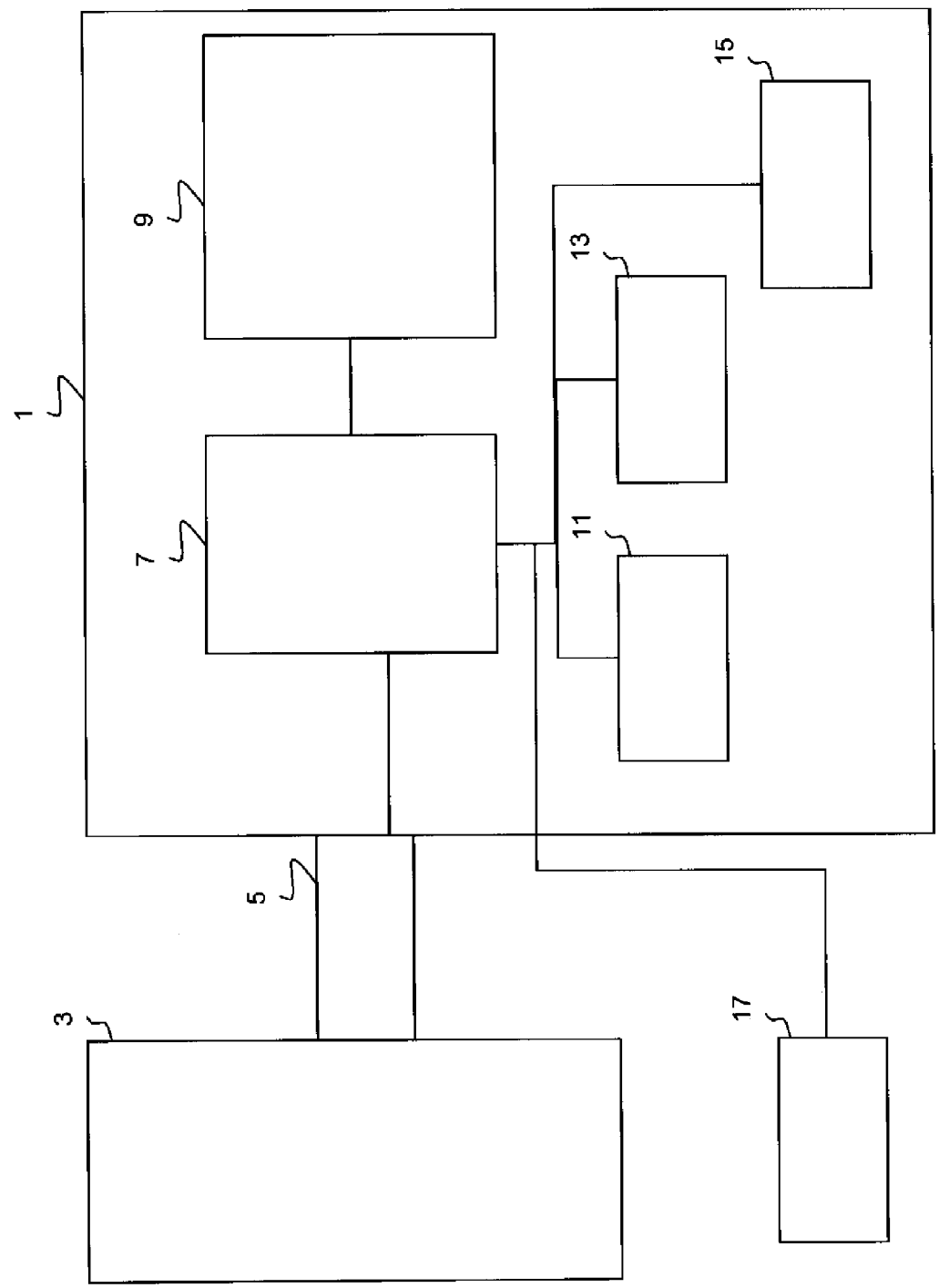
FIG. 1 is a schematic block diagram illustrating an electronic device according to the invention.

FIG. 1 illustrates an exemplary system, in which an electronic device 1 according to an embodiment of the invention is connected to another device 3 and to an external electronic unit, presently a loudspeaker component 17.

The system comprises an electronic device 1, which in turn comprises connecting and distributing means 7, determining means 9, a memory component 11, a general processing component 13, and a chargeable electrical storage component 15. The system further comprises a device 3 to which the electronic device 1 is connected via a connection 5. The system also comprises a loudspeaker component 17 configured to receive electrical power from the electronic device 1 connected to the electronic device 1. Only by way of example will it be assumed that the connection 5 is a USB On-The-Go connection. Also by way of example it will be further assumed that the electronic device 1 is a camera phone, the device 3 is a laptop computer and the connection 5 is used to download and upload files to and from the laptop computer.

The electronic device 1 is connected to the device 3 via a connection 5, which connection permits data communication between the device 3 and the electronic device 1 and also simultaneously and independently permits the transfer of electrical power between the device 3 and the electronic device 1. The connection 5 is supplied with power by either the device 3 or the electronic device 1. The respective entity not supplying power to the connection 5 may receive electrical power from the connection 5.

In the initial situation it may be assumed that the device 3 is supplying electrical power to the connection 5. The connecting and distributing means 7 of the electronic device receive the electrical power and the communication data from the connection 5. The connecting and distributing means 7 further distributes the received electrical power to the memory component 11, the general processing component 13 and to the loudspeaker component 17. The memory component 11, the general processing component 13 and the loudspeaker component 17 require electrical power for normal operation. Further, if the chargeable electrical storage component 15 is not fully charged, the connecting and distributing means 7 also distribute the received electrical power to the chargeable electrical storage component 15.

The chargeable electrical storage component 15 supplies electrical power to the electronic device and its electronic units 11 and 13 when the electronic device is turned on and is not connected to another entity supplying electrical power.

The determining means 9 determines a set of limitations comprising a limitation on the electrical power distributed to the electronic units 11, 13, 15 and 17 by the connecting and distributing means 7. When the connection 5 is initially established between the device 3 and the electronic device 1 and the device 3 is supplying electrical power to the connection 5, which electrical power is received and distributed by the connecting and distributing means 7 to the electronic units 11, 13, 15 and 17, then the determining means 9 determines a set of limitations that does not limit the electrical power received by the connecting and distributing means 7 and distributed to the electronic units 11, 13, 15 and 17. Alternatively, when the connection 5 is initially established between the device 3 and the electronic device 1 and the device 3 is supplying electrical power to the connection 5, then the determining means 9 may determine a set of limitations that limits the total electrical power received by the connecting and distributing means 7 and distributed to the components 11, 13, 15 and 17 to the electrical power corresponding to 100 Milliampere received via the connection 5. Having established the connection 5, after a predetermined time the determining means 9 may determine a set of limitations that limits the total electrical power received by the connecting and distributing means 7 to the electrical power corresponding to 500 Milliampere received via the connection 5. Thus, the electronic units 11, 13 and 17 are powered using the electrical power received from the device 3 via the connection 5 and the chargeable electrical storage component 15 is charged with the electrical power received from the device 3 via the connection 5.

The device 3 may send data over the connection 5 to the electronic device 1 comprising a request for a reduced power consumption of the electronic device. The request for a reduced power consumption may be sent because the device 3 is not itself connected to a power supply but is supplying the power to the connection 5 and to the electronic device 1 from its own battery. In this case, the device 3 aims to prevent premature depletion of its own battery. The request for a reduced power consumption may also be sent because the electronic device 1 is drawing an amount of power from the connection 5 which is exceeding an electrical current budget of the device 3. The device 3 may have an electrical current budget limiting the total electrical current the device 3 is prepared to supply over the connection 5. If the device 3 just strictly limits the electrical current supplied over the connection 5, then it may happen that the connecting and distributing means 7 may try to distribute this limited electrical current to all electronic units 11, 13, 15 and 17, which may result in some electronic units not receiving enough electrical power for proper operation. For example, the general processing component 13 may not function at all if it does not receive a minimum necessary amount of electrical power.

The request for a reduced power consumption is received by the connecting and distributing means 7 and further relayed to the determining means 9.

The determining means 9 receives and processes the request for a reduced power consumption. As a result, a new set of limitations is determined and sent to the connecting and distributing means. This new set of limitations does not limit the electrical power distributed to the memory component 11 and the general processing component 13, but limits the electrical power distributed to the chargeable electrical storage component 15 and to the loudspeaker component 17 to zero. Thus the memory component 11 and the general processing component 13 receive the same amount of electrical power as before whereas the chargeable electrical storage component 15 and the loudspeaker component 17 receive no electrical power. The rationale for this set of limitations is that a sufficient supply of electrical power to the memory component 11 and the general processing component 13 is vital for the functioning of the electronic device 1, whereas blocking off the electrical power distributed to the chargeable electrical storage component 15 and the loudspeaker component 17 will only result in the chargeable electrical storage component 15 not being charged and the loudspeaker component 17 not functioning. The external loudspeaker component 17 provides a less essential functionality than the memory component 11 or the general processing component 15.

If the request for a reduced power consumption was sent by the device 3 because the electrical current consumption of the electronic device 1 via the connection 5 exceeded the current budget and the determining means 9 determine a set of limitations in response to this request in which no electrical current is distributed to the chargeable electrical storage component 15 and the loudspeaker component 17, then the electrical current received by the electronic device 1 from the device 3 via the connection 5 is reduced by the electrical current previously distributed to the loudspeaker component 17 and the chargeable electrical storage component 15. As a consequence the total electrical current received by the electronic device 1 may stay within the electrical current budget of the device 3. Thus the essential electronic units 11 and 13 of the electronic device 1 remain operational while being powered with the electrical current received from the device 3 without exceeding the electrical current budget of device 3.

If and when the device 3 is connected to a power supply like for example a wall socket power supply, then device 3 may have enough electrical power available for its own operation, for charging its own battery and also for supplying all necessary electrical power to the connection 5 and the electronic device 1. Thus device 3 may send an information to electronic device 1 comprising a request to cancel the request for a reduced power consumption.

The determining means 9 then receives and processes the request to cancel the request for a reduced power consumption. Consequently, a new set of limitations is determined by the determining means 9, which set of limitations corresponds to the original set of limitations not limiting the electrical power received by the connecting and distributing means 7 and distributed to the electronic units 11, 13, 15 and 17. This set of limitations is sent to the connecting and distributing means 7.

Figure 2:
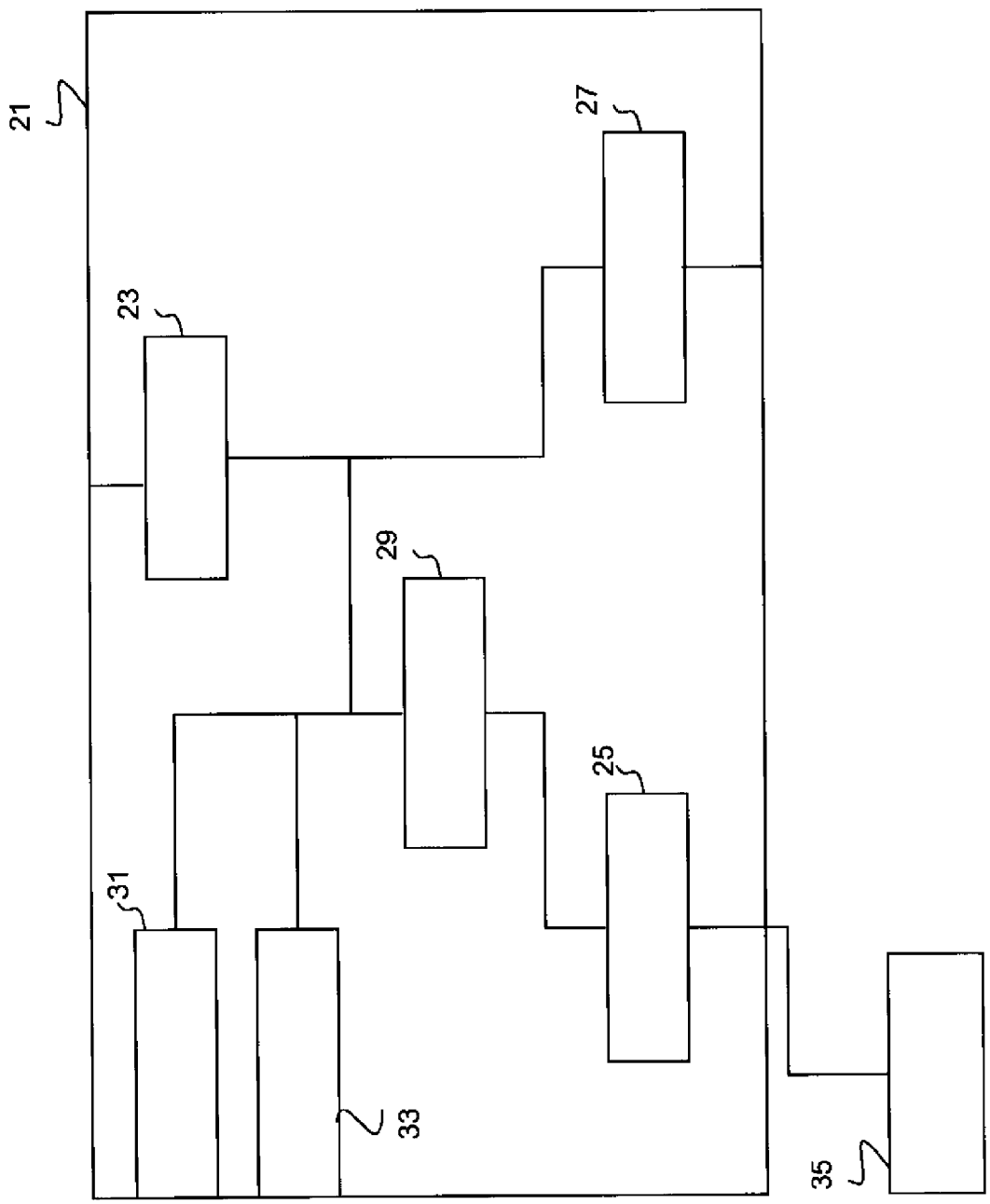
FIG. 2 is a schematic block diagram illustrating a module for an electronic device according to the invention.

FIG. 2 schematically shows a module 21 according to the invention which may for example implement the functionality of the connecting and distributing means 7 and the determining means 9 of FIG. 1.

The module 21 comprises input means 23, first supply means 25, second supply means 27, switching means 29, a register 31 and a WAIT pin 33. The first supply means 25 of the module 21 are further connected to a chargeable electrical storage component 35. Only by way of example will it be assumed that the module 21 is an integrated circuit.

The input means 23 is configured to receive electrical power. The input means 23 may for example comprise an input pin of the module 21 with the associated internal control circuitry. The electrical power received may then be distributed to the switching means 29 and the second supply means 27.

The second supply means 27 may comprise an output pin of the module 21 and the associated internal control circuitry. The electrical power distributed to the second supply means 27 from the input means 23 is supplied to this output pin of the module 21 and may be further supplied to any external component connected to the second supply means 27 via the output pin of the second supply means 27.

The switching means 29 may comprise an electrical switch based on transistors with which the electrical current flow to the first supply means 25 may be limited to a particular value. In particular, the electrical current may be limited to zero and thus blocked off completely. The switching means 29 may also not limit the electrical current flow to the first supply means 25. The electrical current flow limit of the switching means 29 may be adjusted freely.

The first supply means 25 may also comprise an output pin of the module 21 and the respective associated internal control circuitry. The electrical power distributed to the first supply means 25 from the input means 23 via the switching means 29 may be further supplied to any external component connected to the first supply means 25 via the output pin of the first supply means 25. In the illustrated case a chargeable electrical storage component 35 is connected to the first supply means 25.

The register 31 may comprise a programmable wait flag. The register 31, including the wait flag, may be read from or written to using different access methods. Thus may, by way of example, be accessed by the I2C protocol. Also by way of example, the register 31 may further be accessed by the SPI protocol. Thus, the register 31 may be accessed by the electronic device which comprises module 21 or by another entity which is connected to the electronic device comprising module 21.

The wait pin 33 may comprise an input pin of the module 21 and its associated control circuitry. The wait pin may be set by the electronic device which comprises module 21 or by another entity which is connected to the electronic device comprising module 21, for example by connecting the wait pin 33 to a pin on the connector between the other entity and the electronic device comprising module 21.

Setting the wait flag or setting the wait pin causes the switching means 29 to block off the electrical current flow from the input means 23 to the first supply means 25. Thus in the illustrated situation the chargeable electrical storage component 35 would not then receive any of the electrical power received by the input means 23. Instead, all of the electrical power received by the input means 23 would be distributed to the second supply means 27. Resetting the wait flag or resetting the wait pin causes the switching means 29 to no longer block electrical current flow from the input means 23 to the first supply means 25.

By way of example, the chargeable electrical storage component 35 is comprised by the electronic device comprising the module 21. The chargeable electrical storage component 35 is connected to the first supply means 25. If the first supply means 25 receives electrical power, then this electrical power is supplied to the chargeable electrical storage component 35 for charging. The chargeable electrical storage component 35 may store the electrical power to supply it to the electronic device comprising the module 21 and the electrical storage component 35 if and when necessary.

Figure 3:
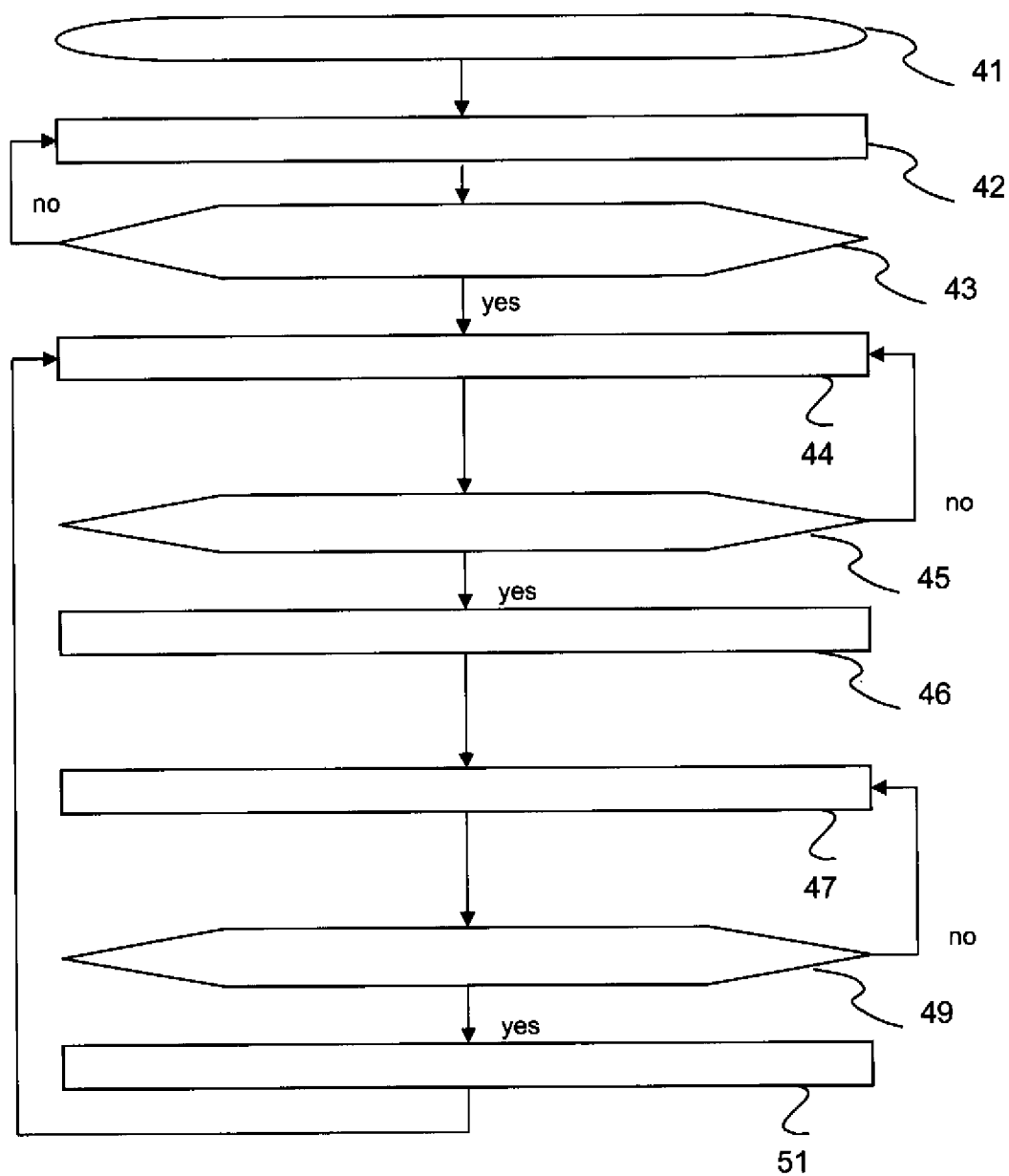
FIG. 3 is a flow chart illustrating an operation according to a method of the invention.

FIG. 3 is an exemplary flow chart that describes whether and when the determining means 9, of the electronic device 1 connected to the device 3, determine a set of limitations blocking off the electrical current supplied to the chargeable electrical storage component 15 and to the external loudspeaker component 17. The exemplary situation proceeds from the point in time at which a connection 5 is established until the moment a set of limitations blocking off the electrical current supplied to the chargeable electrical storage component 15 and to the external loudspeaker component 17 is determined and implemented by the connecting and distributing means 7.

In a first step 41 a connection 5 is established. Only by way of example, it will be assumed that this is an OTG USB connection. The connection 5 enables a transfer of data between the connected electronic device 1 and the device 3 and also a supply of electrical power from the party supplying the electrical power to the connection 5 to the other connected party.

In a second step 42 the kind of connection is determined by the determining means 9. It may be determined whether the connection 5 is a USB connection and, if so, which version of the USB protocol the connection 5 is using, if the connection 5 is a OTG USB connection, a Hi-Speed USB connection, a Hi-Speed OTG USB connection or another kind of USB connection. If the connection 5 is an OTG USB connection or another kind of USB connection in which it may be determined which party to the connection 5 is supplying the electrical power for the connection 5, then it is determined whether the electronic device 1 or the device 3 is supplying the electrical power to the connection 5. In case the connection 5 uses the Micro-USB connector, then the signal level on the ID pin determines if the device 3 is supplying the electrical power to the connection 5.

If in a third step 43 it is thus concluded that the device 3 to which the electronic device 1 is connected is not supplying the power for the connection 5, then it is returned to the preceding second step 42 to determine if and how the kind of connection changes. This may happen if for example the cable for the connection is rearranged, possibly switched in its orientation, or if a parameter of the connection is dynamically switched by a communication between electronic device 1 and device 3. The party to the connection 5 supplying the electrical power to the connection 5 may be dynamically determined by a further version of the USB protocol in a similar way to or by an extension of the HNP used to determine the host of an OTG USB connection. If, on the other hand, it is concluded that the device 3 is supplying the power for the connection 5, then it is proceeds to a fourth step 44.

In the fourth step 44 commands, requests and other messages from the device 3 are awaited and received. A wide variety of commands, requests and messages from the device 3 may be received by the electronic device 1 via connection 5. It is then proceeded to a fifth step 45.

In a fifth step 45 it is determined whether a request for a reduced power consumption has been received from the device 3 in the previous fourth step 44. Only by way of example it is assumed that the request for a reduced power consumption comprises the inhibit charge usage of the power device class of the USB. If no request for a reduced power consumption has been received from the device 3, then it is returned to the previous fourth step 44 for further ongoing awaiting and receiving of commands, requests and other messages. If a request for a reduced power consumption has been received from the device 3, then it is proceeded to a sixth step 46.

In the sixth step a set of limitations is determined by the determining means 9 which set of limitations comprises limits on the electrical power consumption of the electronic units of the electronic device 1 and of the electronic units connected to the electronic device 1 and receiving power from the electronic device 1. By way of example, the set of limitations may block off the electrical current distributed to the chargeable electrical storage component 15 and the loudspeaker component 17 and not limit the electrical current distributed to the memory component 11 and the general processing component 13. It is then proceeded to a seventh step 47.

In the seventh step 47 again commands, requests and other messages from the device 3 are awaited and received. As in the fourth step 44, a wide variety of commands, requests and messages from the device 3 may be received by the electronic device 1 via connection 5. It is then proceeded to an eighth step 49.

In an eighth step 49 it is determined whether a request to cancel the request for a reduced power consumption has been received from the device 3 in the previous seventh step 47. If no request to cancel the request for a reduced power consumption has been received from the device 3, then it is returned to the previous seventh step 47 for further ongoing awaiting and receiving of commands, requests and other messages. If a request to cancel the request for a reduced power consumption has been received from the device 3, then it is proceeded to a ninth step 51.

In the ninth step 51 a set of limitations is determined by the determining means 9 which set of limitations does not comprise limits on the electrical power consumption of the components of the electronic device 1 and of the components connected to the electronic device 1 and receiving power from the electronic device 1. Thus, the same situation is established as immediately after the establishment of the connection 5. It is then returned to a fourth step 44.

Figure 4:
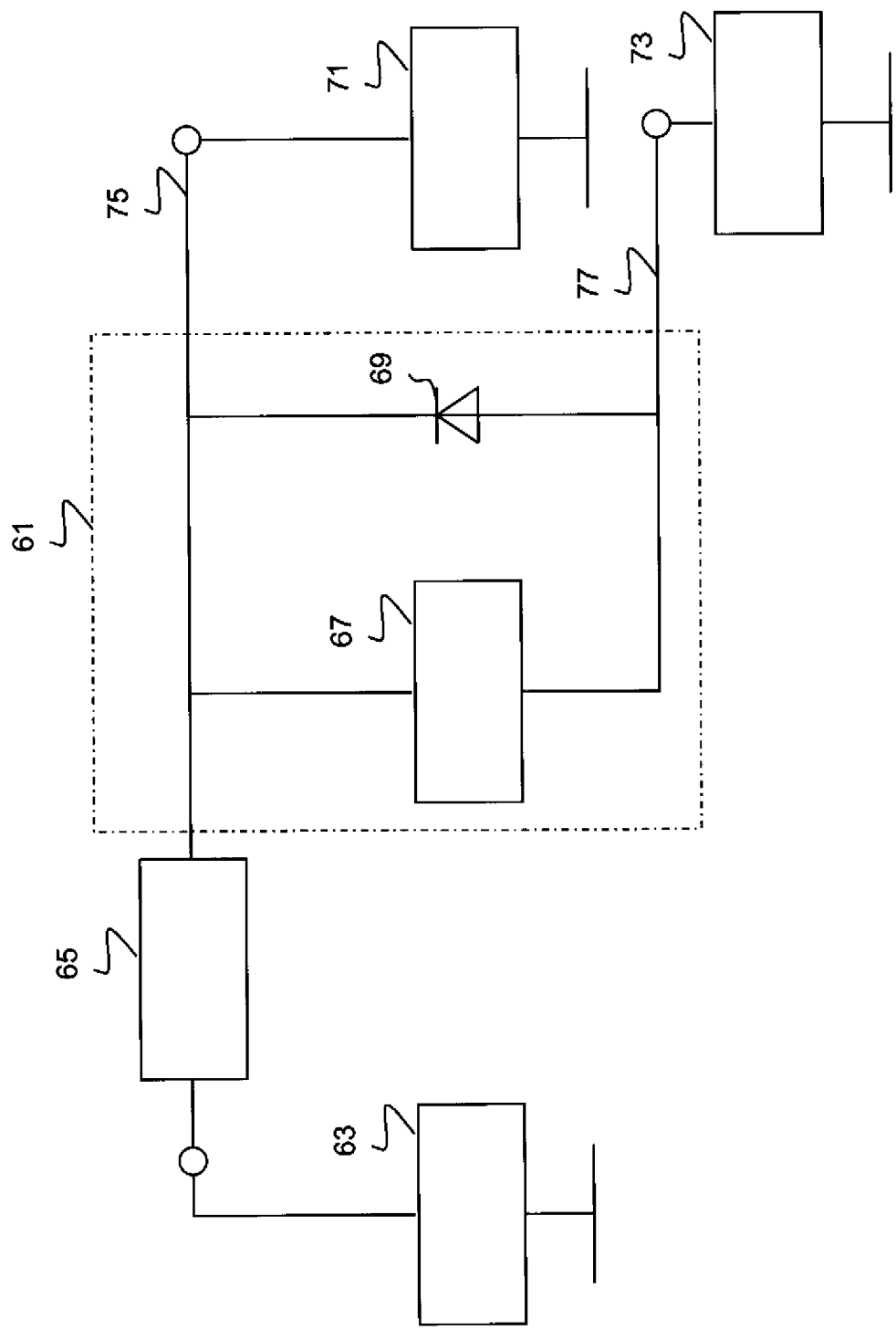
FIG. 4 is a schematic block diagram illustrating a module of a charge and play device according to the invention connected to another device.

FIG. 4 illustrates a module 61 according to the invention comprised in a charge and play device and connected to another device. The module 61 comprises switching means 67 and a component 69 limiting electrical current flow to one direction. The component is connected to a device 63 via a connection 65 and is also connected to a processing system 71 via a play path 75 and further connected to a chargeable battery 73 via a charge path 77. Only by way of example will it be assumed that the connection 75 is an OTG USB connection.

The device 63 supplies electrical power to the connection 65. This electrical power is further supplied to the module 61. Via the play path 75 a portion of the electrical power is supplied to a processing system 71 of the charge and play device. A complementary portion of the electrical power is conducted by the switching means 67 and further supplied to the chargeable battery 73 via the charge path 77. This complementary portion of the electrical power charges the chargeable battery 73.

When the module 61 receives a request to reduce the electrical power consumption or the module 61 receives an information comprising an inhibit charge usage of the power device class of the USB from the device 63 via the connection 65 the switching means 67 may block off the electrical current through the charge path 77. Consequently, only the power distributed to the processing system 71 is supplied via the play path 75 from the connection 65.

When the charge and play device is disconnected from the device 63 the connection 65 is opened and no longer supplies electrical power to the module 61. In this case, the chargeable battery 73 supplies electrical power to the processing system 71 via the play path 75 and via the component 69 limiting electrical current flow to one direction.

Figure 5:
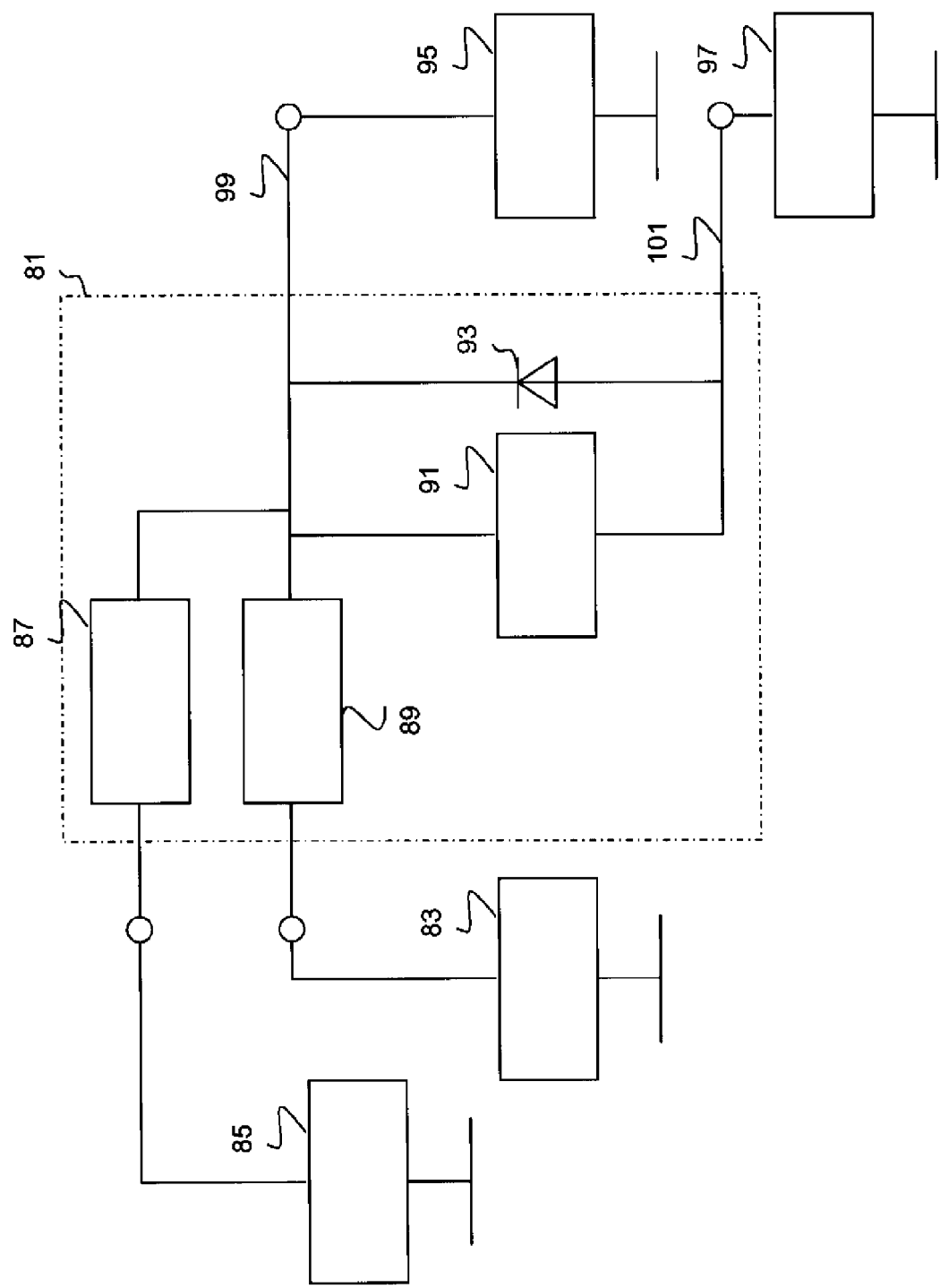
FIG. 5 is a schematic block diagram illustrating an electronic charge and play device according to the invention connected to another device and to a wall socket power supply.

FIG. 5 illustrates a module of an electronic charge and play device 81 according to the invention connected to another device 83 and to a wall socket power supply 85. The charge and play device 81 comprises first connecting means 89, second connecting means 87, switching means 91 and a component 93 limiting electrical current flow to one direction. The charge and play device 81 is connected to a device 83 via first connecting means 89. The charge and play device 81 is connected to a wall socket power supply 85 via second connecting means 87. The charge and play device 81 is also connected to a processing system 95 via a play path 99 and further connected to a chargeable battery 97 via a charge path 101. Only by way of example will it be assumed that the first connecting means 89 are connected to the device 83 via an OTG USB connection.

The device 83 supplies electrical power to the first connecting means 89. The wall socket power supply 85 supplies electrical power to the second connecting means 87. Because the second connecting means 87 is connected to the wall socket power supply 85, the second connecting means 87 supplies all electrical power to the processing system 95 via the play path 99 and to the chargeable battery 97 via the charge path 101 and the conducting switching means 91. No electrical power is supplied from the first connecting means 89. If the wall socket power supply 85 is disconnected from the second connecting means 87, then the first connecting means 89 supply the electrical power received from the device 83 to the processing system 95 via the play path 99 and to the chargeable battery 97 via the charge path 101 and the conducting switching means 91.

When, after the wall socket power supply 85 has been disconnected from the second connecting means 87, the charge and play device 81 receives a request to reduce the electrical power consumption or the charge and play device 81 receives an information comprising an inhibit charge usage of the power device class of the USB from the device 83 via the first connecting means 89. As a result, the switching means 91 may block off the electrical current through the charge path 101. Consequently, only the power distributed to the processing system 95 is supplied via the play path 99 from the first connecting means 89.

When the charge and play device 81 is disconnected from the device 83, the first connecting means 89 is disconnected and no longer supplies electrical power to the charge and play device 81. In this case the chargeable battery 97 supplies electrical power to the processing system 95 via the play path 99 and via the component 93 limiting electrical current flow to one direction.

Figure 6:
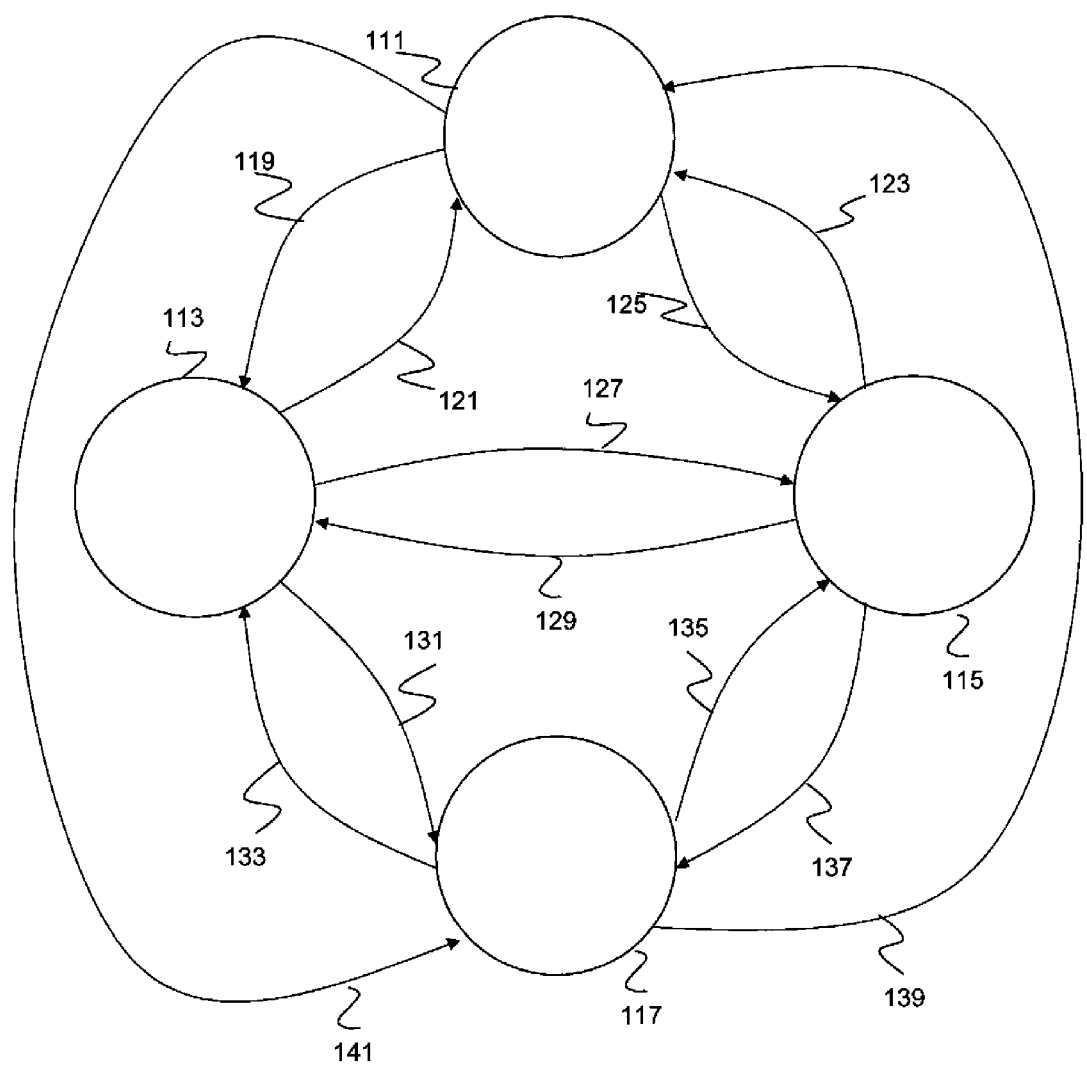
FIG. 6 is a state diagram illustrating the states and state transitions of an electronic device according to the invention.

FIG. 6 illustrates a state diagram of a connection between a charge and play device according to the invention comprising a chargeable battery and another device. In a first state 111, the charge and play device is not connected to the other device. In a second state 113, the charge and play device is connected to the other device and the charge and play device is supplying the power for the connection. The chargeable battery of the charge and play device is not being charged. In a third state 115, the charge and play device is connected to the other device, the other device is supplying the power for the connection, the charge and play device is in play mode and the chargeable battery of the charge and play device is not being charged. In a fourth state 117, the charge and play device is connected to the other device, the other device is supplying the power for the connection, the charge and play device is in charge and play mode and the chargeable battery of the charge and play device is being charged with electrical power received from the connection. From the first state 111, the charge and play device may make a transition 119 to the second state 113 if a connection between the charge and play device and the other device is established and it is determined that the charge and play device is supplying power to the connection. From the first state 111, the charge and play device may make a transition 125 to the third state 115 if a connection between the charge and play device and the other device is established and it is determined that the other device is supplying power to the connection and the charge and play device receives a request to suspend charging. From the first state 111, the charge and play device may make a transition 141 to the fourth state 117 if a connection between the charge and play device and the other device is established and it is determined that the other device is supplying power to the connection. From the second state 113, the charge and play device may make a transition 121 to the first state 111 if the connection is released. From the second state 113, the charge and play device may make a transition 127 to the third state 115 if it is determined that the other device is supplying power to the connection and the charge and play device receives a request to suspend charging. From the second state 113, the charge and play device may make a transition 131 to a fourth state 117 if it is determined that the other device is supplying power to the connection. From the third state 115, the charge and play device may make a transition 123 to the first state 111 if the connection is released. From the third state 115, the charge and play device may make a transition 129 to the second state 1 13 if it is determined that the charge and play device is supplying power to the connection. From the third state 115, the charge and play device may make a transition 137 to the fourth state 117 if the charge and play device receives a request that charging no longer needs to be suspended. From the fourth state 117, the charge and play device may make a transition 139 to the first state 111 if the connection is released. From the fourth state 117, the charge and play device may make a transition 133 to the second state 113 if it is determined that the charge and play device is supplying power to the connection. From the fourth state 117, the charge and play device may make a transition 135 to the third state 115 if the charge and play device receives a request to suspend charging.

The invention claimed is:

1. An electronic device comprising:
   connecting circuitry configured to establish a connection to at least one other device, configured to receive electrical power from the connection to the at least one other device and configured to receive information from the at least one other device via the connection; and
   determining circuitry configured to determine a set of limitations, the set of limitations comprises a limitation of electrical power to be distributed to at least one electronic component of the electronic device and wherein the determining circuitry is further configured to determine the set of limitations based only on the information received from the at least one other device, and wherein the received information comprises a request for a reduced power consumption signal received from the at least one other device.

2. The electronic device according to claim 1, wherein the received information comprises information about the available power of the at least one other device.

3. The electronic device according to claim 1, wherein the connection is a universal serial bus protocol connection.

4. The electronic device according to claim 1, wherein the connection is an IEEE 1394 connection.

5. The electronic device according to claim 1, wherein the connecting circuitry is configured to determine whether the at least one other device is adapted to supply electrical power to the connection.

6. The electronic device according to claim 5, wherein the connection is an on-the-go universal serial bus protocol connection.

7. The electronic device according to claim 6, wherein the connecting circuitry is configured to determine control of the connection by communicating with the at least one other device using a host negotiation protocol.

8. The electronic device according to claim 1, further comprising distributing circuitry configured to distribute the received electrical power to the at least one electronic component according to the determined set of limitations.

9. The electronic device according to claim 1, further comprising at least one electronic component configured to receive electrical power from either at least one other device or a chargeable electrical storage component.

10. The electronic device according to claim 1, wherein the at least one electronic component comprises a chargeable electrical storage component.

11. The electronic device according to claim 10, wherein the received information comprises a request to suspend charging of the chargeable electrical storage component.

12. The electronic device according to claim 10, wherein the set of limitations comprises a limitation of electrical power to be distributed to the chargeable electrical storage component, which limitation is a reduced level of electrical power consumption limitation.

13. The electronic device according to claim 10, wherein the set of limitations comprises a limitation of electrical power to be distributed to the chargeable electrical storage component, which limitation is a zero level of electrical power consumption limitation.

14. The electronic device according to claim 1, wherein the at least one electronic component is externally connected to the electronic device.

15. A module for an electronic device comprising:
   an input configured to receive electrical power from at least one other device;
   a first supply circuit configured to supply a first portion of the received electrical power to a chargeable electrical storage component;
   a second supply circuit configured to supply a second portion of the received electrical power to an electronic component of the electronic device; and
   a switching circuit configured to switch off the first portion of the received electrical power supplied to the chargeable electrical storage component by the first supply circuit, upon receipt of a reduce power consumption signal originating solely from one of the at least one other devices.

16. The module according to claim 15, wherein the second portion of the received electrical power is complementary to the first portion of the received electrical power.

17. The module according to claim 15, wherein the module is an integrated circuit.

18. The module according to claim 15, wherein the module is a processing component.

19. The module according to claim 15, comprising a register adapted to control the switching circuit, the register is configured to be written to by a serial line protocol.

20. An electronic device comprising:
- an input adapted to receive both electrical power and electronic information;
- a switching circuit connected between the input and a charge path, the switching circuit adapted to allow or disallow a first portion of the received electrical power from being provided to the charge path based only on receipt of a reduce power consumption information signal received from the input;
- a current limiting device connected between the input and the charge path, the current limiting device adapted to limit current from flowing from the input to the charge path; and
- an output electrically connected to the input, the output configured for connection to a processing system such that the electronic information and either a second portion of the electrical power from the input or electric power from the charge path are provided to the processing system, the charge path adapted to connect to a rechargeable battery.

* * * * *